United States Patent [19]

Ducret

[11] 4,055,097

[45] Oct. 25, 1977

[54] AUTOMATIC CUTTER FOR ARMORED CABLE

[76] Inventor: Lucien C. Ducret, c/o Seatek Co., Inc., 1156 E. Putnam Ave., Riverside, Conn. 06878

[21] Appl. No.: 703,779

[22] Filed: July 9, 1976

[51] Int. Cl.² .................. B23D 45/04; B27B 5/20
[52] U.S. Cl. .................................. 83/169; 83/490; 83/463; 144/249 R; 83/374; 83/387; 83/282; 83/484; 83/465
[58] Field of Search .............. 83/490, 484, 463, 169, 83/374, 375, 377, 386, 387, 262, 282, 465; 144/249 R

[56] References Cited

U.S. PATENT DOCUMENTS

| 1,219,935 | 3/1917 | Gorton | 83/463 |
| 2,726,688 | 12/1955 | Flood | 83/169 |
| 2,923,333 | 2/1960 | Nicholson | 144/249 R |
| 3,741,061 | 6/1973 | Bevacgua | 83/490 |
| 3,991,637 | 11/1976 | Boge | 83/490 |

Primary Examiner—Donald R. Schran
Attorney, Agent, or Firm—DeLio and Montgomery

[57] ABSTRACT

An automatic BX cable cutter including a cable guide and clamp, a circular saw carried by a floating pivoted carriage actuated between cutting and inactive positions by a cam, the machine being so electrically coordinated that, when the saw motor is started and the cable end is inserted into its guide to a pre-set stop point, the clamp screw moves to cable-holding position, and the feed motor permits the carriage and saw to be raised to cutting position; after the cut has been made, the saw is retracted, the clamp screw drive is reversed and the cable is released.

9 Claims, 5 Drawing Figures

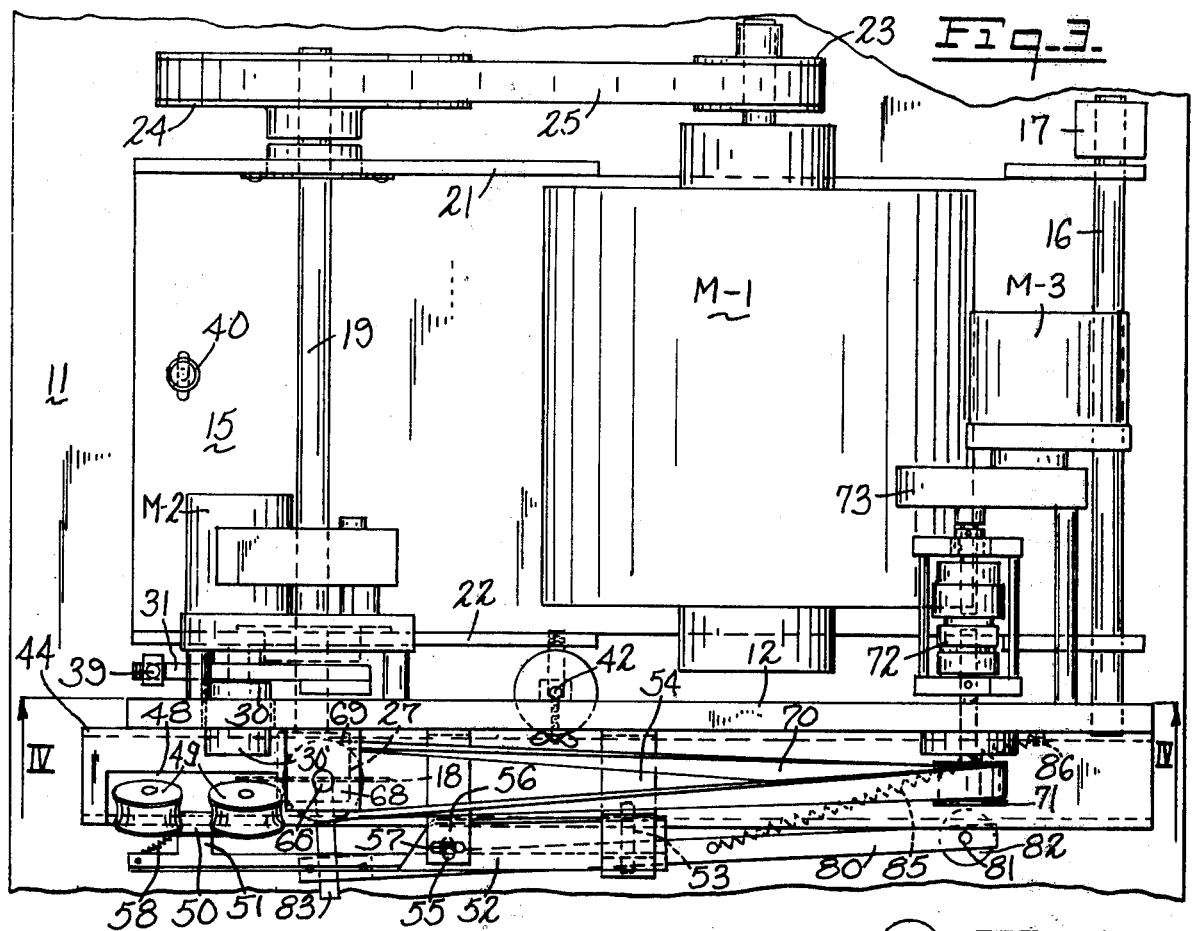
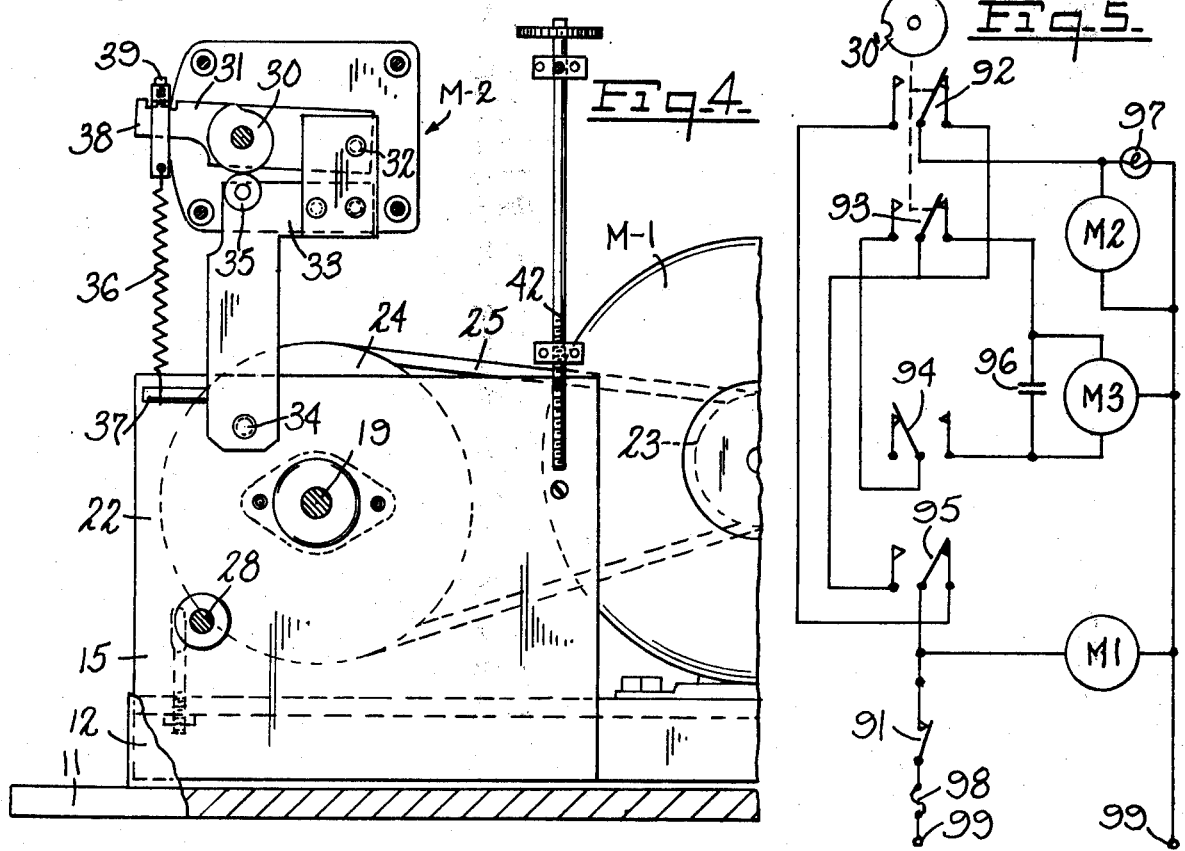

AUTOMATIC CUTTER FOR ARMORED CABLE

This invention relates to an automatic cutter for the armor on BX cable comprising a cable guide and clamp, a circular saw carried by a floating pivoted carriage actuated between cutting and inactive positions by a cam and separate motors for driving the saw, the clamp and the cam in a fixed sequence of operations, initiated by the insertion of the cable end into the guide to a pre-set stop point, or by manual or timing means.

Hand held and manually operated devices have been developed to replace the use of hack saws or files in the cutting of shielded conduits, such as BX cable and the like, so that the shielding or armor can be cut accurately, with precisely limited penetration (if any) into the cable. An example of such a device is shown in applicant's U.S. Pat. No. 3,851,387.

In certain manufacturing and/or assembly operations it may be necessary to cut and remove armor from the ends of a substantial number of pieces of BX cable, such that manual holding and sawing is arduous and time consuming.

It is a accordingly an object of the invention to provide a fully automated cutting machine, adapted to receive and cut accurately the armor on cable ends of a range of sizes, wherein the only manual adjustment is for the desired length of armor to be removed.

It is a further object of the invention to provide a cutting machine wherein the motor for actuating the saw carriage is entirely disassociated from the cutting forces and thus requires minimal power.

It is another object of the invention to provide a cutting machine wherein the cable is clamped in cutting position by a screw which is driven by a belt drive with a slip clutch and a timed switch to reverse the motor and release the clamp after cutting has been effected.

It is another object of the invention to provide improved means for lubricating the saw blade.

It is yet another object of the invention to provide improved cable guiding means.

It is a further object of the invention to provide certain improvements in the form, construction and arrangement of the several parts whereby the above named and other objects may effectively be attained.

The invention accordingly comprises the features of construction, combination of elements, and arrangement of parts which will be exemplified in the construction hereinafter set forth, and the scope of the invention will be indicated in the claims.

A practical embodiment of the invention is shown in the accompanying drawings wherein:

FIG. 3 represents a top plan view of the machine;

FIG. 4 represents a vertical section on the line IV—IV of FIG. 3, parts being broken away; and FIG. 5 is a wiring diagram showing the interconnection of the motors and control switches.

Figure 1:
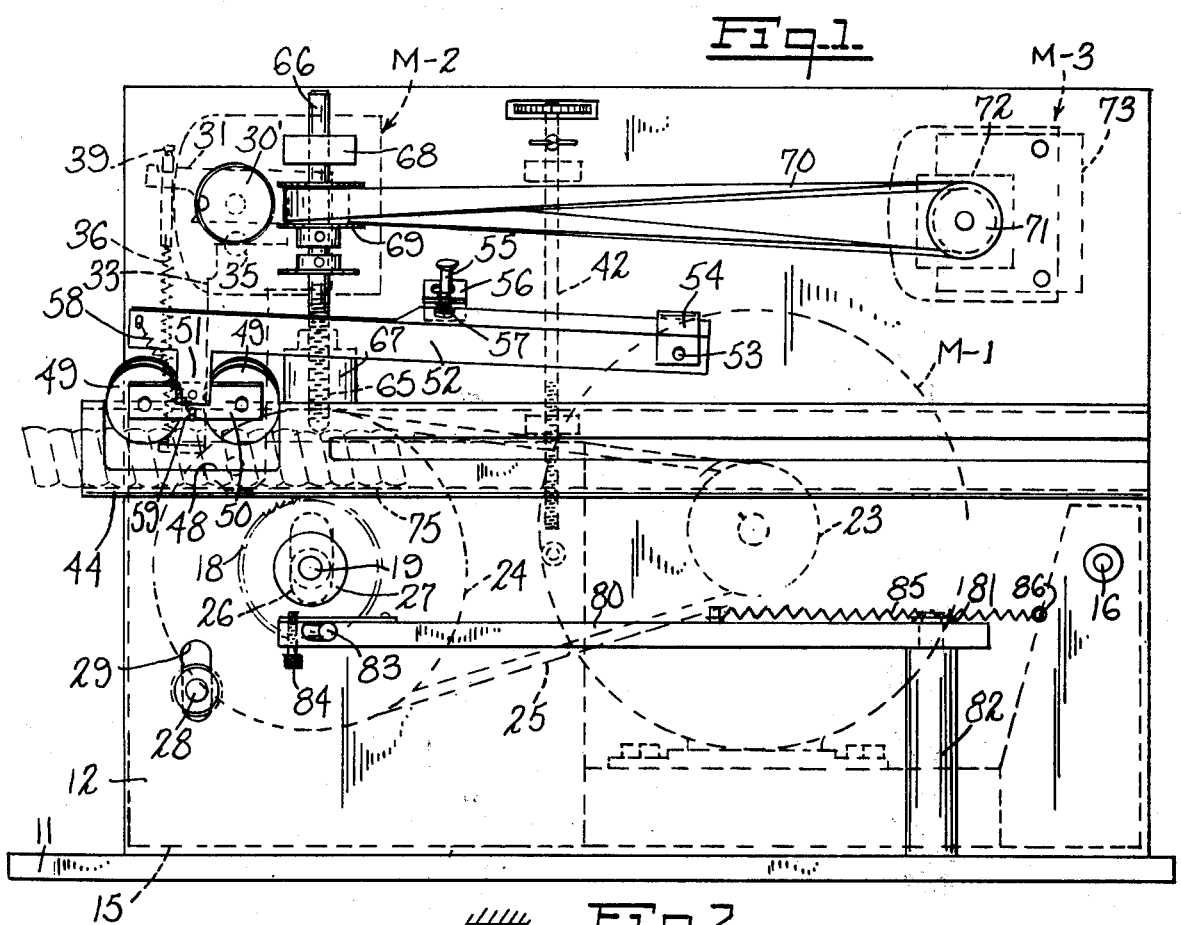
FIG. 1 represents a working side elevation of the machine.

Referring to the drawings, the machine frame comprises a flat base 11 and a vertical wall 12, integral with the base and extending vertically therefrom parallel to and spaced from one edge thereof.

Figure 2:
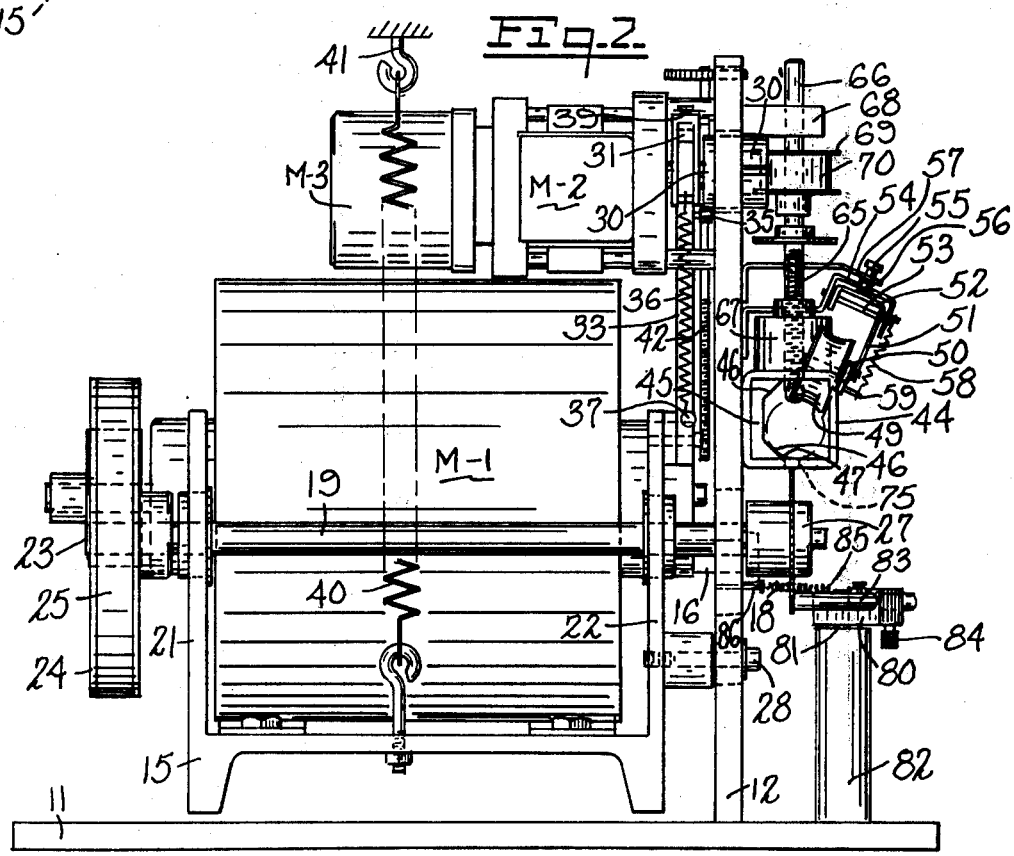
FIG. 2 represents a front or in-feed side elevation of the machine.

The cutting saw mounting and drive assembly includes the carriage 15 which is pivoted on a horizontal axle 16, adjacent the rear end of the carriage, one end of the axle resting in the wall 12 and the other end in a post 17 fixed to the base. The motor M-1 is bolted to the carriage, and the saw 18 is mounted on a saw drive shaft 19, journaled in plates 21, 22 on the carriage near its front edge, the motor power being transmitted from a pulley 23 on the motor shaft to a pulley 24 on the saw drive shaft by a belt 25 (FIGS. 2 and 3). The saw drive shaft is elongated and projects freely through a vertical slot 26 in the wall 12, the saw blade 18 being mounted on the projecting end of the shaft by means of a hub 27.

The carriage is stabilized by the provision of a bolt 28 with a ferrule and washers, movable in the vertical slot 29 in the wall 12 and screwed into the post 22; the ferrule having a shoulder which permits bolt 28 to be driven home while still allowing a small clearance for free movement of carriage 15.

The feed assembly for the cutting saw carriage (FIG. 4) includes a feed motor M-2 mounted on the wall 12 in an area above the slot 26 and driving, through suitable reduction gearing, a cam shaft and cam 30. A toggle linkage system includes an arm 31, journaled between its ends on the cam shaft, one end of the arm being pivotally connected at 32 to a link 33 which is pivotally connected at 34 to the plate 22 of the carriage. The link 33 carries a cam follower 35 in a position to bear against the cam 30, and the force with which the link and cam follower are biased toward the cam is derived from the spring 36, in tension between the pin 37 on the link, near its base, and the end 38 of the arm 31, where tension adjusting means 39 is provided. The weight of the carriage, and elements mounted thereon, is closely counterbalanced by means of the spring 40, connecting the carriage to a support 41 at a fixed distance above the base 11 of the machine frame. The action of the cam 30, through the follower 35, is to drive the carriage (and saw) downward and to permit it to rise, as the spring 36 draws together the link 33 and arm 31. The screw 42, passing through lugs on the rear of the wall 12 can be adjusted to limit the upward movement of the carriage.

The cable guide is constituted by a tube 44 of substantially square cross-section extending horizontally across the full width of the wall 12 midway of its height and fixed to said wall. Adjacent its intake end the tube is provided with a shoe 45 having faces 46 which lie at about a 45° angle to adjacent tube walls so that the lower face 46 intersects the lower tube face at an open angle between about 100° and 170°, preferably about 135°, to form a V or apex 47 in which a cable can be securely held, as by guide rollers and a clamp. In the area of the shoe 45 the upper and outside walls of the tube are cut away to provide an opening 48 to receive the concave faced guide rollers 49, journaled in the ends of a rocker 50 which is pivoted centrally on a downward projection 51 of the guide roller support arm 52. This arm is pivoted at 53 to a bracket 54 on the wall 12, its pivot being angled so that the rollers move toward apex 47 (FIG. 2). Midway of its length the arm 52 is provided with a pin or bolt 55, passing through a slot in the bracket 56 and provided with a spring 57 under compression, to bias the guide rollers downward; if a bolt is used, the spring force can be adjusted, in a conventional manner. A light spring 58 extends from a pin 59 on the rocker 50 below its pivot point to the end of the arm 52, to bias the rocker toward a position such that a cable end being inserted will pass freely under the first roller and lift the second one.

Clamping of the cable, in a fixed position, is effected by the cable clamp, constituted by the lower end of a screw 65 on the clamp shaft 66 supported in lugs 67, 68 on the face of the wall 12, the screw being threaded in the lug 67 and the shaft being rotatable and slidable in the lug 68. The clamp shaft is driven through the toothed pulley 69 by the positive drive belt 70 and the driving pulley 71. The latter pulley can be driven in either direction by the reversible motor M-3, acting through the slipclutch 72 and gear box 73, so arranged that the clamp shaft is positively driven in the unscrewing direction while the clutch slips when the clamp has been screwed into engagement with a cable to be cut. A timing switch or limit switch stops the motor when the clamp has been unscrewed sufficiently to release the cable. The cable clamp passes through the upper wall of the cable guide tube 44 at a point substantially directly above the slot 75 in the lower wall of the tube, but slightly offset to the right in order to always bias the cable against lower face 46 of shoe 45 through which the saw blade passes to cut the lower surface of the cable. The point of the clamp will normally rest in a low spot of the cable surface, which is somewhat corrugated by reason of the nature of the helical armor, while the adjacent guide rollers will bear on the cable surface at two or more points.

A useful adjunct to the machine is the blade lubrication system which comprises an arm 80 mounted at 81 on a support 82 for pivotal movement in a horizontal plane. The free end of the arm carries a dry lubricant stick 83 held by a thumb screw 84. The arm is so located and dimensioned that an inwardly projecting end of the stick 83 bears against the saw blade 18 at its periphery (FIGS. 1, 2 and 3) and the arm is lightly biased in that direction by the overcenter spring 85 between the arm and a pin or the like 86 on the face of the wall 12.

This type of lubrication is particularly suitable and effective because of its automatic response to operating conditions; when the circular saw penetrates the BX cable surface heat is generated, melting the lubricant stick at the point of contact and lubricating the saw adjacent its periphery, the heavier the cutting action the heavier being the lubrication. When inactive or cold the luricant stick remains solid, and it can easily be replaced when worn down to an impractical length.

The operation of the machine can be controlled manually, as by a group of switches for the respective motors, or prefereably in an automatic manner by a simple programming device, the elements of which may be considered conventional.

In the wiring diagram, FIG. 5, the main switch is shown at 91. The switches 92, 93 are in the one revolution cam system, actuated by the cam extension 30', integral or associated with cam 30. The switch 94 is a limit switch for return of the clamping screw, and the switch 95 is an adjustable limit switch, arranged to be tripped by the cable. Also shown are the reversing motor capacitor 96, the pilot light 97 and a fuse 98. The power supply terminals are indicated at 99. The saw carriage feed motor is provided with a built-in brake to prevent coasting and to maintain registration.

The sequence of operation is as follows:

1. Main switch 91 is closed and saw motor M-1 starts.
2. Cable is introduced into the machine, through guide tube 44 and past rollers 49 to an adjustable stop (not shown) which trips the switch 95 to start the motors M-2 and M-3. The cable is clamped by operation of the fast motor M-3, and cam 30 starts to rotate, the linkage system 31 - 35 and spring 36 bringing the saw blade up to cut the cable armor and returning it to inactive position.
3. The switches 92, 93 are actuated by rotation of the cam to cause motor M-3 to reverse the clamping screw, reopening switch 94 to stop the motor M-3. Opening of switch 92 stops the motor M-2 and turns off the pilot light.
4. When the pilot light goes off the cable is withdrawn, the switch 95 resets and sends power to switch 92 which restarts motor M-2 briefly, to reset the switches 92 and 93, the motor M-2 then being stopped, with the machine ready for the next cycle.

The duration of each cutting cycle is normally on the order of 8 seconds.

The arrangement is such that, if the cable is retrieved before the end of the cutting cycle, the clamping screw will not be fully backed up and will restart from a lower position in the following cycle; this feature can be used to advantage with smaller cables, since the full cycle time is shortened.

Since the guide tube 44 could, in the absence of a stop, permit the passage of a cable of any length from inlet end to and past the outlet end, it will be understood that cuts can be made as just described at any number of points along the length of a cable. In combination with feeding and measuring devices, connected to trigger the cutter motors at suitable instants, the cutter could be set up to make cuts in the armor at any desired intervals along a cable length, and the cable could be subdivided as desired near or between the armor cuts, such as to produce stripped ends if desired.

It must be noted that the motor M-1 has no function other than driving the saw blade for which relatively low power suffices. The motor M-2 acts, through cam 30, to move the blade away from the work, toward which it has been drawn by the linkage system 31 - 39, so that this motor also operates at minimum power.

It will thus be seen that the objects set forth above, among those made apparent from the preceding description are efficiently attained and, since certain changes may be made in the above construction without departing from the spirit and scope of the invention, it is intended that all matter contained in the above description or shown in the accompanying drawings shall be interpreted as illustrative and not in a limiting sense.

What I claim is:

1. An armored cable cutting machine comprising, a base, cable guiding and holding means supported on said base, a carriage mounted on said base for pivotal movement about a horizontal axis, a circular saw carried by the carriage, a motor on the carriage for driving the saw, and carriage moving means including a carriage feed motor supported on the base, a cam on a cam shaft and driven by the feed motor, a toggle linkage system having one link journaled on the cam shaft and another link connected to the carriage, and resilient means cooperating with said links to bias the carriage toward cutting position.

2. An armored cable cutting machine comprising, a base, cable guiding means and cable holding means supported on said base, a carriage mounted on said base for pivotal movement about a horizontal axis, a circular saw carried by the carriage a motor on the carriage for driving the saw, and means for moving the carriage to bring the saw into and out of cable armor cutting positions, the cable holding means including a clamping screw and reversible driving means for driving the screw into and out of engagement with the cable at a point substantially opposite the cutting position of the saw.

3. A machine according to claim 2 wherein the screw driving means includes a reversible motor supported on the base.

4. A machine according to claim 3 which includes a slip-clutch between said reversible motor and said clamping screw.

5. An armored cable cutting machine comprising, a base, cable guiding means and cable holding means supported on said base, a carriage mounted on said base for pivotal movement about a horizontal axis, a circular saw carried by the carriage, a motor on the carriage for driving the saw, and means for moving the carriage to bring the saw into and out of cable armor cutting positions, the cable guiding means including a tubular element, two adjacent walls of which meet at an angle between 100° and 170°, and means positioned to bias the cable toward the apex of said angle.

6. A machine according to claim 5 wherein said biasing means comprises at least one roller, a roller supporting element and a spring acting on said element.

7. A machine according to claim 6 wherein the biasing means comprises two rollers aligned in series and journaled in a rocker mounted on the supporting element.

8. An armored cable cutting machine comprising, a base, cable guided and holding means supported on said base, a carriage mounted on said base for pivotal movement about a horizontal axis, a circular saw carried in a position adjacent the guiding and holding means, a motor on the carriage operatively connected to the saw, carriage moving means including a carriage feed motor supported on the base and toggle linkage connecting the feed motor to the carriage, and cable holding means including a clamping screw, a reversible motor supported on the base and a clutch between the reversible motor and the clamping screw.

9. A machine according to claim 8 which includes an electrical circuit system interconnecting said motors for sequential and simultaneous actuation thereof automatically through a single complete cable armor cutting cycle.

* * * * *